United States Patent [19]

Durso

[11] 4,254,258

[45] Mar. 3, 1981

[54] PROCESS FOR THE PREPARATION OF CELLULOSE ETHER DERIVATIVES

[75] Inventor: Donald F. Durso, Rocky Hill, N.J.

[73] Assignee: Texas A & M University System, College Station, Tex.

[21] Appl. No.: 24,551

[22] Filed: Mar. 28, 1979

[51] Int. Cl.$^3$ .......................... C08B 1/06; C08B 1/08; C08B 11/00; C08B 11/12

[52] U.S. Cl. ...................................... 536/98; 241/28; 536/84; 536/86; 536/101

[58] Field of Search ..................... 536/98, 101, 86, 84; 241/28

[56] References Cited

U.S. PATENT DOCUMENTS

| | | | |
|---|---|---|---|
| 2,313,866 | 3/1943 | Finlayson | 536/101 |
| 2,510,355 | 6/1950 | Waldeck | 536/98 |
| 2,596,015 | 5/1952 | Dunwody | 241/28 |
| 2,982,765 | 5/1961 | Grun et al. | 536/98 |
| 3,552,457 | 1/1971 | Bos | 241/28 |
| 3,857,833 | 12/1974 | Warzecha et al. | 536/101 |
| 3,914,130 | 10/1975 | Newcomer | 536/101 |
| 4,140,281 | 2/1979 | Fulghum et al. | 241/28 |

OTHER PUBLICATIONS

Svensk Papperstidning NR 2, 1976, vol. 79, pp. 50–51.
McMillian, Complete Tree Utilization of Southern Pine, Aug. 1978, pp. 305–308.

*Primary Examiner*—Ronald W. Griffin
*Attorney, Agent, or Firm*—Arnold, White & Durkee

[57] ABSTRACT

There is disclosed an improved process for preparing cellulose ether derivatives which in pertinent part accomplishes this by providing for the uniform distribution of caustic and etherifying reagents over the exposed area of fiberized, never-dried, non-purified natural polysaccharide materials by fluidizing said materials while simultaneously contacting the material with said reagents.

9 Claims, No Drawings

PROCESS FOR THE PREPARATION OF CELLULOSE ETHER DERIVATIVES

BACKGROUND OF THE DISCLOSURE

The process of the instant invention concerns the preparation of cellulose ether derivatives from "never-dried" cellulose, i.e., a natural or native cellulose which has not previously been dried by any type of preliminary processing after having been harvested.

Generally, in the standard processing of cellulose to produce ether derivatives the cellulose is separated from any non-cellulosic materials existing with the cellulose in its natural state and this separated cellulose is thereafter highly purified. Next, the highly purified cellulose is dispersed in a liquid medium, treated with a caustic reagent such as sodium hydroxide in order to form a soda cellulose, and then treated with an etherifying reagent such as chloroacetic acid in order to form the cellulose ether derivative. Carboxyl methyl cellulose (CMC) is produced when chloroacetic acid is employed as the etherifying reagent.

In the typical process scheme for the production of cellulose ether derivatives, the starting material is a special pulp such as a dissolving pulp, e.g., chemical cellulose. Years ago, only cotton linters were used as the raw material but with the advent of the acid bisulfide process wood pulp became available. Sometime during the 1940's, it was discovered that a pulp having the necessary reactivity could be made by the addition of an acid prehydrolysis step to the Kraft process. Since that time, the prehydrolysis Kraft process has been employed extensively for the production of high purity pulps. These high purity pulps are used for high strength products. For example, high strength products such as tire cord and reinforcing cord for V-belts and conveyor belts, can be produced from the pulp produced from fibers of the southern pine subjected to the prehydrolysis Kraft process.

Selected hard woods were employed in the prehydrolysis kraft process before the southern pine was used. One such hard wood is the black gum (black tupelo *Nyssa sylvatica* Marsh). Pulps obtained from the prehydrolysis Kraft processing of black gum fibers are especially useful for certain processes where fiber dimensions and purity are important. World-wide producers of specialty pulps have now learned how to use other hard woods; however, for reasons not readily apparent, the "mixed hard wood" pulps have not been utilized as extensively in end product application as have the pulps from the black gum.

The need to utilize wood efficiently is manifest. Recent publications have recognized the need to reduce logging wastes and have also urged the use of "noncommercial" hard woods. The energy crisis has increased the use of wood and it has now become clear that new sources are needed in order to produce more fiber for physical and chemical end products.

The cost of pulp production has risen dramatically since 1960 due to various factors including inflation, energy shortages and the need for pollution control. As a result, the investment per annual ton of pulp production has risen such that the size of an economic chemical pulping unit has now become about 1000–1200 tons per day. In addition to these factors, suitable timber sources are not as readily available as in the past.

In order to alleviate this situation complete tree utilization would appear to be necessary. In one method of employing this concept, complete tree utilization involves on-site chipping of the entire tree and delivery of the chipped tree to the pulp mill as a mixture which may require segregation before being converted into pulp. For example, the chipped tree may be fractionated into a main stream useful for normal pulping and a by-product waste stream useful as fuel. It is quite posible that the complete tree utilization concept may be used in the thermomechanical defibration pulp wood reduction process. (That process has recently attracted much attention because of its high product yield and the low economic investment required).

One manner in which the aforementioned problems could be reduced would be to utilize wood or a partially delignified derivative thereof in place of the dissolving pulp which is currently employed in the cellulose ether derivative preparation processes. When first considered, the thought of using a natural wood in such a process would not appear to be feasible; however, the concept must be fully explored before it is discarded.

In green wood, the carbohydrates and lignin are structurally arranged in such a biochemically accessible form that the needs of the tree are readily met. As used throughout this application, the term "accessbility" is intended to refer to the relative ease with which a chemical reagent can react with the reactive sites of carbohydrate molecules. For example, accessibility with reference to the production of cellulose ether derivatives has reference to the relative ease with which a chemical reagent such as an etherifying reagent can react with the hydroxyl groups of the cellulose molecules.

Conventional pulping and bleaching operations usually provide for the removal of lignin and hemicelluloses by use of chemical treatments and machine drying at elevated temperatures. During these operations, the molecular structural arrangement of the wood is changed and the accessibility is significantly reduced. Because of this, it is necessary to activate such structurally altered cellulose in order to provide the accessibility necessary to produce cellulose ethers.

Assay is a measure of accessibility. Assay is actually a measure of the percent soluble material in a product mass after the etherifying reaction is completed. For example, since cellulose is not soluble and CMC (an ether derivative) is soluble, a high Assay value indicates a high conversion of cellulose to CMC. Any cellulosic fiber or a portion thereof which has a minimum D.S. will have some measure of solubility.

When the accessbility of the cellulose structure is decreased because of chemical processing and drying during its isolation from a native raw material, the degree of substitution ("D.S.") of the resultant product from an etherifying reaction system typically increases. D.S. is a measure of the average degree of reaction of each cellulose molecule. More particularly, D.S. is the number of alcohol groups per glucose molecule that have been reacted. Obviously, the maximum value of D.S. possible is 3.0. For example, if all the reaction sites in purified cellulosic fibers are uniformly and equally available, the typical cellulosic feed stock should result in a product having a D.S. of about 1.0.

In 1976, the instant inventor had published in volume 79 of Svensk Papperstidn an article which disclosed that never-dried Kraft pulp can be converted into CMC by use of a novel process which employed a mole ratio of cellulose:NaOH:ClCH$_2$CO$_2$H of 1:2.0–2.5:1.2–1.4. The publication further disclosed that the never-dried, partially-delignified (Kraft) fibers could be converted to "commercial" CMC in a total reaction time 40% of that employed in standard processes. The process outlined in the publication simply noted that the typical steps of (1) dispersion, defibration and wetting-out of fibers; (2) conversion into alkali (soda) cellulose; and (3) time-controlled addition of derivative reagent could be combined into one simple step.

However, even with this disclosure in the art improvements in the cellulose ether derivative manufacturing process were needed to further reduce processing costs by reducing the quantity of materials used and by reducing the total processing time.

SUMMARY OF THE INVENTION

It has been discovered that the process for the preparation of cellulose ether derivatives from a never-dried, non-purified natural polysaccharide can be improved by minimizing the step of dispersing the material in a suitable reaction medium before converting the material to an alkali cellulose. This can be accomplished by fluidizing the raw feed material during the contacting of that material with caustic and etherifying reagents. This fluidization step eliminates the need to disperse the cellulose feed stock in an aqueous reaction medium and, accordingly, saves material, time and money.

"Fluidizing fiberized material" or similar language as used herein is intended to refer to the process step of dispersing the fiberized material in a non-aqueous reaction medium whereby the reactive alcohol groups of the cellulosic material are exposed and accessible to react with caustic and etherifying reagents. Preferably, the fiberized material is fluidized in an air suspension system.

The improved process of the instant invention comprises: fiberizing a never-dried, non-purified natural polysaccharide material; fluidizing that fiberized material; contacting the fluidized material with a caustic reagent, preferably in the form of a finely atomized mist; further contacting the same material with an etherifying reagent, also preferably in the form of a finely atomized mist; and, if a reasonably pure product is desired, recovering the prepared cellulose ether derivative.

The fiberization step and the fluidization step may be executed simultaneously. Also, the fluidized material may be contacted substantially simultaneously with both a caustic reagent and an etherifying reagent.

The fiberized material need only be maintained in a fluidized state during the initial contacting of the material with caustic and etherifying reagents. Once the cellulose ether derivative preparation reaction has been initiated there is no longer a critical need to maintain the fiberized material in a fluidized state.

In the process of the instant invention the total reaction time is temperature dependent. That time, including caustic reagent contacting time, may range from about 100 to about 5 minutes with respective reaction temperatures ranging from 55° to 95° C.

The novel process may be practiced by employing a cellulose: caustic reagent: etherifying reagent mole ratio of about 1.0:2.0–2.95:1.2–1.9.

One aspect of the invention which is particularly attractive is that it may be used as a sole process unit or it may be integrated into the processing scheme of wood processing plant (pulpmill) in order to more efficiently handle waste materials.

Other aspects of the instant invention should become apparent from the description of the preferred embodiment.

DESCRIPTION OF THE PREFERRED EMBODIMENT

In the practice of the instant invention, cellulose ether derivatives may be produced from a fiberized, never-dried, non-purified, natural polysaccharide material (including wood and bagasse) by fluidizing the fiberized material and contacting it with a caustic reagent and an etherifying reagent. The fiberized material need only be maintained in a fluidized state during the contacting of it with the caustic and etherifying reagents and, thereafter, the initiated reaction can be allowed to proceed without having to maintain the fiberized material in a fluidized state.

In the preferred embodiment of the instant invention the comminuted material from mixed hardwoods such as any oak, birch, sweet gum, bay or any combination thereof, is utilized as the never-dried polysaccharide material. This material is introduced into a disc refiner such as a 36-1CP, 54 inch, standard size refiner made by the Sprout-Waldron & Co., Inc. Before processing in the refiner, the hardwood or mixture of hardwoods is preferably processed by a chipper. Such chippers are well known in the art and the processed wood should have a chip size from about ½ to 2 inches. Preferably the chip size should be from about 1 to 1½ inches long with a ⅛ inch thickness. Next, the chips are introduced into the refiner by any suitable conveying means such as a feed screw.

Once in the refiner, the material is fiberized and simultaneously fluidized. In the preferred embodiment, the caustic reagent, sodium hydroxide, and the etherifying reagent, chloroacetic acid, are introduced into the intermediate section (somewhere between the inlet and outlet of the refiner) of the disc refiner. The two reagents can be introduced substantially simultaneously and in the preferred embodiment, the inlet for the caustic reagent should be at a point closer to the breaker bar section than the inlet for the etherifying reagent. The inlet for the latter reagent should be disposed a bit further away from the center of the disc than the inlet for the caustic. Hence, it should be closer to the fine bar refining section of the disc refiner.

In the preferred embodiment, the molar ratio of cellulose:NaOH:chloroacetic acid is 1:2.0–2.95:1.2–1.9.

Once the comminuted material is contacted with the two reagents and completes the refining step it may be conveyed to any suitable vessel where it can be allowed to complete the etherifying reaction. The etherifying reaction is temperature dependent and the total reaction time starting from the time of contact of the material with the caustic reagent, ranges from about 100 to about 5 minutes with the respective reaction temperature ranging from 55° to 95° C. That is to say for example that, the total reaction time at 55° C. is about 100 minutes. Once the etherifying reaction has been completed the produced ether derivative, in the preferred case being CMC, may be separated from the by-products by conventional means and used for any suitable purpose as is well-known in the art. However, it should be understood that the produced CMC with by-products can be utilized "as is" in many applications. For example, the produced CMC may be employed as a builder in commercial detergents such as those which are used to wash cars and trucks.

Conventional processing of cellulosic material to produce cellulose ether derivatives generally requires the use of an essentially pure cellulosic material; however, in the practice of the instant invention it is possible to employ a cellulose which contains both lignin and hemicelluloses. For example, the mixed hardwoods, which are preferably employed as the raw material in the process of the instant invention typically have a cellulose content of about 49 to about 53 percent by weight; a lignin content of about 22 to about 23 percent by weight; and a hemicellulose content of about 29 to about 25 percent by weight. The presence of lignin and hemicelluloses in the feed is not an impediment to the practice of the instant invention since, for example in the preferred embodiment, those compounds are believed to be converted to carboxy-methyl derivatives. Of course, such carboxy-methyl derivative compounds could be permissibly used in applications not requiring a high purity CMC product.

The removal of intra-fiber water from the feed material, even if such removal is accomplished at room temperature, will result in a product having a reduced Assay and an increased DS. For example, dry wood is entirely inactive as an etherifying starting material and would result in a product having an Assay of about 0 to 2 percent.

It should be understood that some machine dried pulps such as for example commercial sulfite paper towel stock can be utilized in the practice of the instant invention if sufficient time is allowed for activation of the material. That is, in the case of a dried cellulose material where the tubular physical structure of the native cellulose fiber has become collapsed and convoluted and resultantly inaccessible to chemical reagents, the accessibility can be improved by water soaking and extended periods of maceration. However, it appears that previously dried material having been processed to artificially induce accessibility will never be quite as reactive as those natural materials which have never been dried.

In the practice of the instant invention, it is preferred to employ a cellulosic material which has a chip size of about 1 to about 1½ inches long before introduction into the refiner. In the preferred process the refiner reduces the chip to individual fibers.

The expression "never-dried, non-purified natural polysaccharide material" is intended to refer to a natural or native cellulose material which has not previously been dried during or following any type of preliminary processing after having been harvested. The material may contain lignin and hemicelluloses. Such material may include waste from wood converting plants, i.e., sawmills, pulpmills, etc., including materials such as sawdust.

The never-dried polysaccharide material should be fiberized in order to make the reactive alcohol groups of the cellulose completely available to react with the caustic and etherifying reagents. This is so because the preferential reaction, after the caustic and etherifying reagents have been added, is the production of cellulose ether derivatives from the exposed cellulose. However, under conditions where an insufficient amount of reactive cellulose is present, the caustic and etherifying reagents will react together. It is the recognition of this mechanism which leads to the conclusion that the never-dried material should preferably be fiberized in order to make the reactive alcohol groups of the cellulose available. Thus, in the preferred embodiment, with a sufficient number of reactive alcohol groups available, the two necessary reagents may be added simultaneously and the preferential reaction of producing cellulose ether derivatives should occur.

In the preferred embodiment the polysaccharide material utilized is fiberized in a disc refiner such as a 36-1CP manufactured by Sprout-Waldron & Co., Inc. Other refiners such as those made by C. E. Bauer Brothers Co. or Defibrator may be employed. As is well-known in the art, the state of the material after being processed by the refiner may be varied depending on the different types of discs employed in the refiner. In the preferred embodiment, the chips are reduced to individual fibers by the refiner. This reduction of chips to individual fibers may also be accomplished by other means, as, for example, by pressurized steam processing as employed in the Masonite process.

Although it is preferred to use a disc refiner to simultaneously fiberize and fluidize the cellulosic, i.e. polysaccharide material, it should be understood that the material may first be fiberized by any suitable process or means and then this fiberized material can be dispersed in a non-aqueous medium by suitable means including introducing it into a high speed mixer where the causticizing and etherifying reagents can be introduced.

As is well-known in the art, in producing ether derivatives of cellulose a caustic reagent is typically used to produce an alkali (soda) cellulose. In the preferred embodiment of the instant invention, sodium hydroxide is utilized as the caustic reagent. The amount of the caustic reagent employed may vary from about 2.0 to about 2.9 moles of caustic reagent per mole of cellulosic feed stock.

Once the alkali cellulose has been formed the cellulosic material may be contacted with a suitable etherifying reagent. Of course, the selection of this reagent is dependent upon the type of ether derivative desired. Since in the preferred embodiment CMC is prepared, chloroacetic acid is employed as the etherifying reagent. The amount of the acid employed ranges from about 1.2 to about 1.9 moles of acid per mole of cellulosic material. As with the amount of caustic reagent employed, it is preferred to employ no more than a stoichiometric quantity of etherifying reagent.

In the practice of the instant invention, it is preferred to add the caustic and etherifying reagents substantially simultaneously. Also, it is preferred to introduce the reagents in the form of an atomized mist so that uniform distribution over the exposed surface of the cellulose material will be facilitated. Any method of atomizing the reagents may be employed; however, the two reagents should not be mixed before they are contacted with the cellulosic material. In the preferred embodiment when using a disc refiner to fiberize and fluidize the polysaccharide feed stock, the caustic reagent may be introduced into the disc refiner at a point approximately half of the distance between the center point of the disc and a point on the outside circumference of the disc. The etherifying reagent can then be introduced at a point between the point of introduction of the caustic reagent and the point on the outer circumference of the disc.

What is important is that both reagents should contact the polysaccharide material when it is in a fiberized and fluidized state. Once the initial contact is made and the etherifying reaction is initiated, the polysaccharide material no longer need be fluidized and may be conveyed by any convenient manner to any suitable vessel until the reaction is completed.

The total reaction time required to prepare ether derivatives of cellulose is temperature dependent. That total reaction time, starting from the time the cellulosic material is contacted with the caustic reagent, ranges from about 100 to about 5 minutes with reaction temperature ranging from 55° to 95° C. respectively.

Any suitable method of recovering the produced ether derivative may be utilized. Usually in recovering the produced cellulose ether derivative from the reaction mass, the ether derivative is dissolved out and precipitated with alcohol if a pure derivative is desired. If a technical grade derivative, one typically containing salt, is desired the entire solution may be spray-dried. The first method is certainly preferred where a pure product is desired. Both methods of recovery are well-known in the art.

The following tests are exemplary:

In two tests performed to illustrate the efficacy of utilizing a non-aqueous dispersion medium a slightly delignified mixed hardwood pulp was used as the source of cellulose. This material was completely defiberized to a size of about 30–40 microns in diameter and 2–4 mm in length. In each test 15 grams of the pulp and the reagents, contained in perforated cap bottles, were placed in a plastic bag and then the contents were mixed by violent shaking of the bag for 30–40 seconds. During the addition of the reagents the pulp was at a temperature of about 40° C.

After the reagents had been added, the plastic bags were immersed in a water bath and maintained at 55° C. for the remainder of the reaction time which in each case was about 210 minutes (including reagent addition time).

In Example I, the amount of sodium hydroxide added was 40 ml of a 30 percent aqueous solution and the amount of chloroacetic acid was 18 grams. In Example II only ⅔ of the amount of the reagents used in Example I were added.

At the end of the reaction time, the resultant mixture was spread out on a large watch glass and dried at 60° C. under 20 inches of Hg vacuum overnight. No neutralization or washing of sample was performed prior to drying. The results are as follows:

| Ex. | D.S. | Assay | Yield |
|---|---|---|---|
| I | 0.99 | 10.09 | 41.6g |
| II | 0.952 | 9.28 | 31.6g |

The results confirm that cellulose ether derivatives can be produced by a caustic-etherifying reagent process where the cellulosic raw material is not placed in an aqueous reaction medium. The results also indicate that the reagents were poorly distributed but they do confirm a good reactivity. It should be recognized that the violent shaking of the pulp in the bag was intended only to simulate an air dispersed (fluidized) reaction medium but that only a quite imperfect simulation of a fiberized-fluidized system is obtainable with such a laboratory technique.

While the preferred embodiment described above should be understood to be the best mode presently contemplated, it is by no means the only mode possible. The scope of the invention is defined by the following claims and by any equivalent modifications and variations that may fall within the true spirit and scope of the invention.

What is claimed is:

1. A process for the preparation of cellulose ether derivatives from a never-dried, non-purified natural cellulose material comprising:
   fiberizing said natural material;
   fluidizing said fiberized material;
   contacting said fluidized material with a caustic reagent to form a soda cellulose; and
   contacting said fluidized material with an etherifying reagent;
   wherein said fiberizing and fluidizing steps are performed substantially simultaneously; and
   wherein said contacting of said fluidized material with said caustic reagent and said contacting said fluidized material with an etherifying reagent are performed substantially simultaneously.

2. The process of claim 1 wherein the total reaction time, including caustic reagent contacting time, ranges from about 100 to about 5 minutes with a respective reaction temperature ranging from 55° to 95° C.

3. The process of claim 1 wherein the mole ratio of cellulose material to caustic reagent is in the range of about 1.0:2.0 to about 1.0:2.95 and wherein the mole ratio of cellulose material to etherifying reagent is from about 1.0:1.2 to about 1.0:1.9.

4. The process of claim 3 including the step of recovering said prepared cellulose ether derivatives.

5. A process for the preparation of cellulose ether derivatives from a never-dried, non-purified natural cellulose material comprising the following steps which are performed substantially simultaneously:
   fiberizing said material;
   fluidizing said fiberized material;
   contacting said fluidized material with an atomized mist of a caustic reagent to form a soda cellulose, wherein the mole ratio of fluidized material to caustic reagent is in the range of about 1.0:2.0 to about 1.0:2.95; and
   contacting said fluidized material with an atomized mist of a etherifying reagent, wherein the mole ratio of fluidized material to etherifying reagent is from about 1.0:1.2 to about 1.0:1.9;
   wherein the total reaction time, including caustic reagent contacting time, ranges from about 100 to about 5 minutes with a respective reaction temperature ranging from 55° to 95° C.

6. The process of claim 5 wherein said caustic reagent is sodium hydroxide and wherein said etherifying reagent is chloroacetic acid.

7. In a process for the preparation of cellulose ether derivatives from the reaction of a cellulosic material with a caustic to form soda cellulose followed by the reaction of said soda cellulose with an etherifying reagent to form a cellulose ether, the improvement comprising:
   utilizing a never-dried, non-purified natural cellulosic material;
   fiberizing said material;
   fluidizing said fiberized material;
   contacting said fluidized material with an atomized mist of a caustic reagent to form soda cellulose; and
   contacting said fluidized material with an atomized mist of an etherifying reagent;
   wherein the total reaction, including caustic reagent contacting time ranges from about 100 to about 5 minutes with a respective reaction temperature ranging from about 55° to 95° C.;

wherein said cellulosic material is fiberized and fluidized substantially simultaneously; and wherein said fluidized material is contacted substantially simultaneously with said caustic reagent and said etherifying reagent.

8. The process of claim 7 wherein the mole ratio of fluidized material to caustic reagent is in the range of about 1.0:2.0 to about 1.0:2.95 and wherein the mole ratio of fluidized material to etherifying material ranges from about 1.0:1.2 to about 1.0:1.9.

9. The process of claim 8 wherein said caustic reagent is sodium hydroxide and wherein said etherifying reagent is chloroacetic acid.

* * * * *